United States Patent [19]

Bartholomew

[11] Patent Number: 5,531,560
[45] Date of Patent: Jul. 2, 1996

[54] MOTORCYCLE TOWING DEVICE

[75] Inventor: Donald D. Bartholomew, Mt. Clemens, Mich.

[73] Assignee: Proprietary Technology, Inc., Bloomfield Hills, Mich.

[21] Appl. No.: 295,851

[22] PCT Filed: Mar. 19, 1992

[86] PCT No.: PCT/US92/02217

§ 371 Date: Sep. 7, 1994

§ 102(e) Date: Sep. 7, 1994

[87] PCT Pub. No.: WO93/18936

PCT Pub. Date: Sep. 30, 1993

[51] Int. Cl.⁶ .................................................. B60P 3/06
[52] U.S. Cl. ........................... 414/563; 414/462; 414/428; 280/402
[58] Field of Search ..................... 254/8 R, 131; 414/563, 462, 428, 426, 427, 490, 444, 434, 437, 442; 280/402, 204, 411.1, 412, 413

[56] References Cited

U.S. PATENT DOCUMENTS

| Re. 18,424 | 4/1932 | Hess . |
| Re. 18,428 | 4/1932 | Hess . |
| 1,185,381 | 5/1916 | Dawson . |
| 1,855,172 | 4/1932 | Hess . |
| 1,921,029 | 8/1933 | Hess . |
| 1,949,962 | 3/1934 | Hess . |
| 2,437,811 | 3/1948 | Folden .................................. 414/430 |
| 2,541,582 | 2/1951 | Hawkins . |
| 2,629,611 | 2/1953 | Covington . |
| 3,713,672 | 1/1973 | Robbins . |
| 3,776,572 | 12/1973 | Bane . |
| 3,785,517 | 1/1974 | Brajkovich . |
| 3,822,898 | 7/1974 | Brownlie . |
| 3,947,055 | 3/1976 | Allen ..................................... 414/444 X |
| 3,979,137 | 9/1976 | Lipscomb, Jr. et al. . |
| 4,133,402 | 1/1979 | Soo Hoo . |
| 4,147,373 | 4/1979 | Cully . |
| 4,592,564 | 6/1986 | Warnock et al. . |
| 4,763,914 | 8/1988 | Lemmons . |
| 4,822,069 | 4/1989 | Burgess . |
| 4,826,385 | 5/1989 | Martinsen ........................... 414/563 X |
| 4,921,390 | 5/1990 | Baines . |
| 4,944,648 | 7/1990 | Parr ..................................... 414/490 X |
| 5,145,308 | 9/1992 | Vaughn et al. ...................... 414/563 X |

*Primary Examiner*—Frank E. Werner
*Attorney, Agent, or Firm*—Harness, Dickey & Pierce

[57] ABSTRACT

The invention relates to a trailer 10 for towing vehicles having a single front wheel, such as a motorcycle, behind another vehicle. The trailer 10 includes a heavy duty frame 12 having concave shaped wheel carriages which engage the front wheel tire 26 of the vehicle to be towed. The configuration of the trailer 10 permits loading of the vehicle's front tire 26 by rotating the trailer 10 about the trailer wheels axis and rolling the vehicle's front tire into the concave wheel carriage 20. The tire 26 is then secured to the carriage 20 and the trailer 10 is rotated to engage the towing vehicle 32. This rotation lifts the vehicle front tire over and in front of the trailer wheels axle axis thereby suspending the front wheel of the vehicle or vehicles being towed off the ground, while the towed vehicle(s) rear tire remains on the ground.

19 Claims, 5 Drawing Sheets

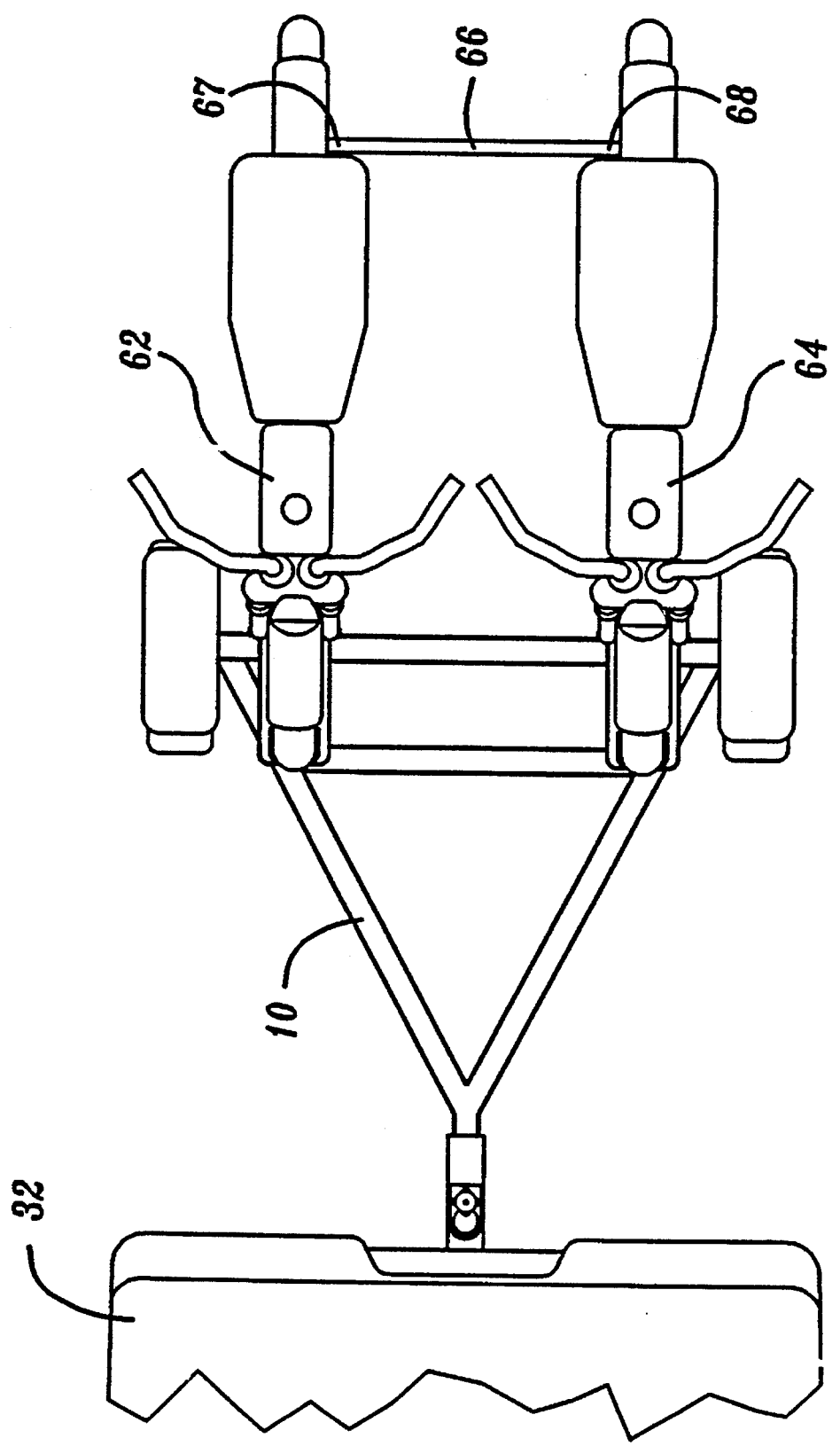

MOTORCYCLE TOWING DEVICE

This application is a 371 of PCT/US 92/02217 filed Mar. 19, 1992, now U.S. Pat. No. WO93/19936.

BACKGROUND OF INFORMATION

This invention relates to a device for transporting vehicles having a single front wheel, such as a motorcycle, to the desired destination by towing them behind a motor vehicle, such as a car, pick-up truck or recreational vehicle. While many different motorcycle towing devices are known, most of them are inconvenient to use or are incapable of towing more than one motorcycle at a time. The present invention allows a single motorcycle or a pair of motorcycles to be easily loaded and unloaded onto the trailer by rolling the motorcycle or motorcycles into the wheel carriages extending from the frame of the trailer. The carriage(s) leading edge is positioned on the ground by rotating the trailer about the axis of the trailer wheels. Once the carriage(s) have been positioned, the front motorcycle tire is rolled into the carriage(s) and secured to the carriage. The high side walls of the carriages further secure the motorcycle(s) in an upright position. The trailer is then rotated, carrying the front tire of the motorcycle over and ahead of the trailer axle, as the trailer is attached to the towing vehicle. When more than one vehicle is being simultaneously towed, a stabilizing member is attached between the rear sections of the vehicles to preclude the vehicles from coming into direct contact with each other.

SUMMARY OF THE INVENTION

Several types of trailers are used for towing motorcycles and other sport vehicles behind another vehicle, such as a car, truck or recreational vehicle. Most of these devices are the type which attach at the rear bumper of the towing vehicle and includes the more traditional trailer upon which the entire motorcycle is positioned during transport. Another type of motorcycle towing device is provided with manually operated lever means which lift and hold the front wheel of the motorcycle off the ground while the rear wheel remains in contact with the ground.

Often, however, disadvantages arise in using these various forms of motorcycle towing devices. One such disadvantage involves stabilizing the motorcycle in an upright position. Another disadvantage is the extended period of time it takes to prepare the motorcycle to be towed and removed from the motorcycle towing device. Another disadvantage is that most motorcycles are too heavy for many bumper hitch type towing devices. Yet another disadvantage is that it often takes two people to load a heavy motorcycle into and out of the carrier portion of the trailer. Lastly, many of the prior art towing devices are only capable of towing a single motorcycle.

In order to obviate the disadvantages of the prior art, a new and improved trailer capable of transporting two motorcycles simultaneously is provided which is strong, lightweight, inexpensive and easy to use.

It is, therefore, an object of the invention to provide an improved motorcycle trailer capable of transporting a pair of motorcycles.

Another object of the invention is to provide a motorcycle trailer capable of being loaded and unloaded quickly and easily.

A further object of the invention is to provide a motorcycle towing device adaptable to transport motorcycles having various sized front tires.

A further object of the invention is to provide a motorcycle trailer which maintains the motorcycle or motorcycles being towed in an upright position during transport.

A further object of the invention is to provide a motorcycle trailer which is readily manufactured at a low cost.

A further object is to provide means for preventing contact between two vehicles being towed simultaneously.

A still further object of the present invention is to provide a motorcycle trailer which allows the front end of the motorcycle to be lifted off the ground while the rear wheel of the motorcycle is maintained on the ground which does not require cranking a lever or operating a pump to suspend the front wheel of the motorcycle.

Additional objects and advantages of the present invention will become apparent from reading the detailed description of preferred embodiments which make reference to the following set of drawings in which:

BRIEF DESCRIPTION OF THE DRAWINGS

FIG. 5 is a top view of the present invention as engaged by two motorcycles and incorporating stabilizing means between the two motorcycles.

BRIEF DESCRIPTION OF PREFERRED EMBODIMENTS

Figure 1:
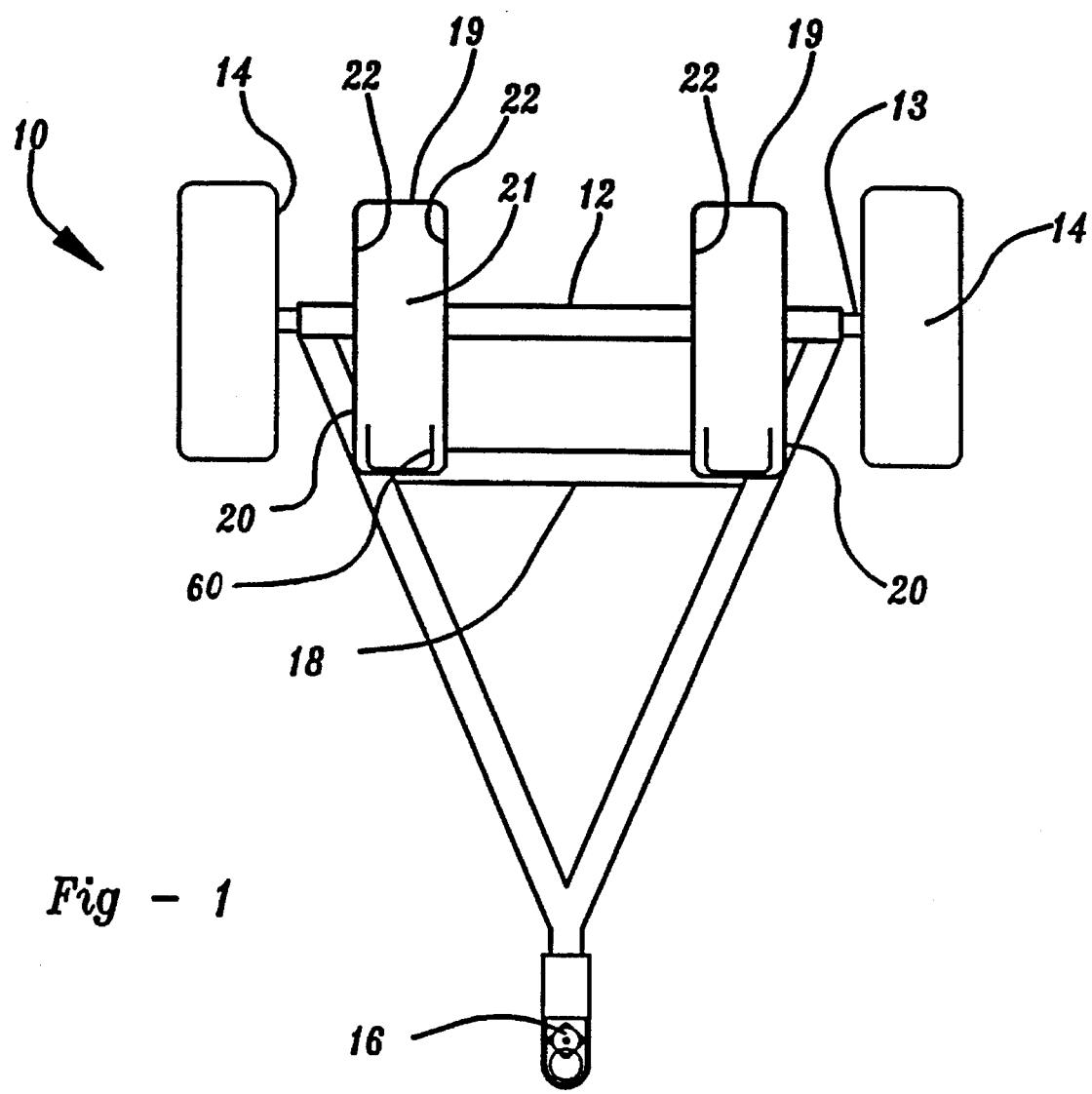
FIG. 1 is a top view of the present invention, prior to engagement by a vehicle or vehicles.

FIG. 1 shows a top view of the present invention. The trailer 10 is comprised of a pair of wheels 14, a frame 12, wheel carriages 20, a carriage stabilizer 18, and a hitch 17. The two carriages 20 are sufficiently spaced apart so that two motorcycles can conveniently be towed simultaneously. The carriages 20 are secured above the frame by a stabilizing member 18 which extends between the two carriages 20. The stabilizing member 18 serves the function of holding the carriages 20 in place as the trailer 10 encounters bumps while in tow.

Various hitch styles may be utilized with the present invention, in the present embodiment a standard ball and socket arrangement provide the means of connection between the trailer 10 and automobile 32. Although two motorcycles can be towed simultaneously by the present invention, for convenience this description is directed to towing a single motorcycle.

Figure 2:
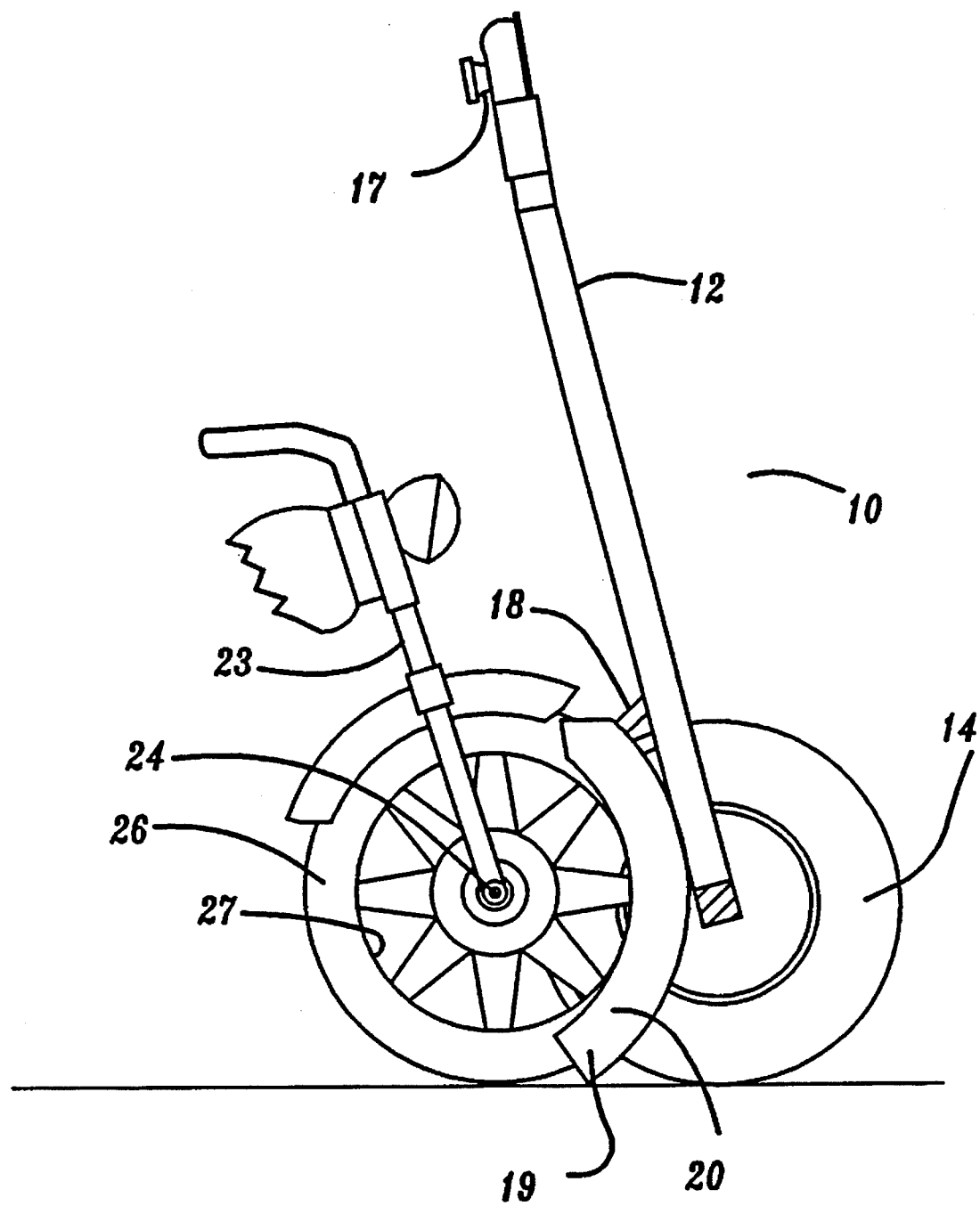
FIG. 2 is a side view partially in cross-section of the present invention in the preload position.

FIG. 2 is a side view, partially in cross-section of a trailer 10 shown in the preloaded position. The frame 12 as shown has been rotated upward about the axles 13 such that the frame 12 is almost perpendicular to the ground thus positioning the trailer to be loaded with the motorcycle's front wheel tire 26. In this preload position, the leading edges 19 of wheel carriages 20 are positioned against the ground to allow the front wheel 26 of the motorcycle to roll into and easily engage the concave trough portion 21 of carriage 20. The carriages 20 are designed such that carriage walls 22 engage the tire 26 just below the tire's rim 27. When the front wheel 26 of the motorcycle being towed is fully engaged within the carriage trough 21 no less than twenty percent (20%) of the front tires circumference is contained within the trough 21. These high carriage walls 22 serve to stabilize the front end of the motorcycle thereby preventing the laterally movement of the front tire mounting fork 23. This in turn maintains the motorcycle in its upright position.

Figure 4:
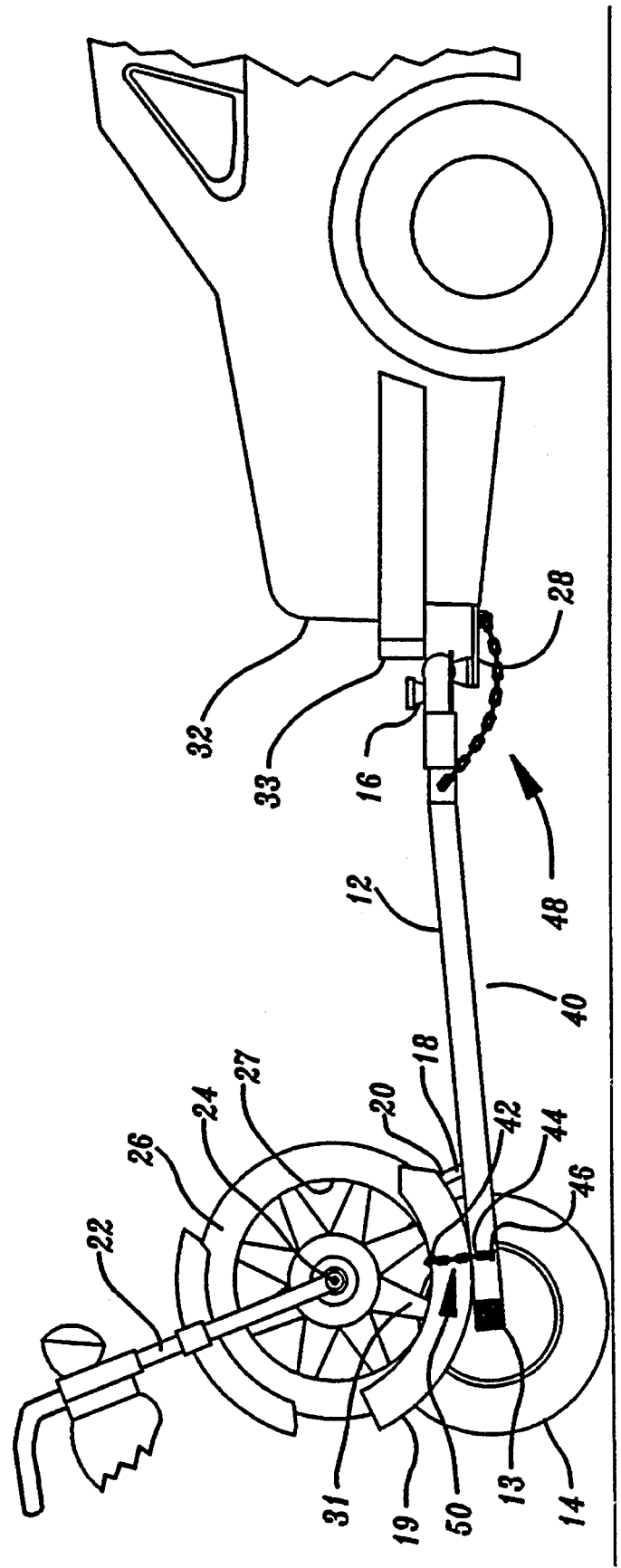
FIG. 4 is the view of FIG. 3 incorporating means of securing both the motorcycle(s) and the present invention.

Once the motorcycle's front wheel tire 26 has engaged carriage 20, a wheel retaining device 50, as shown more clearly in FIG. 4, is then installed to retain front wheel 26, and prevent the front wheel 26 from rotating within the carriage 20. With the motorcycle's front wheel 26 locked in place, frame 12 is rotated downward about the axles 13, which causes the motorcycle's front end to be raised off the ground. As the front end of the motorcycle elevates, the motorcycle's front tire mounting forks 23 simultaneously are moved toward vehicle 32 about the trailer's axle 13. At all times, the motorcycle's rear tire (not shown) remains on the ground. Carriage 20 is positioned to transfer the weight of the motorcycle at forks 23 upon trailer 10 between trailer axle 13 and vehicle 32. This over axis distribution of weight also assists in maintaining the motorcycle or other vehicle to be towed in an upright position. It is contemplated that a ramp (now shown) could be attached to carriage 20 at lead in portion 19 to assisting in inserting the vehicle's front wheel into the carriage 20 under certain circumstances where it would be inconvenient to merely roll the front wheel directly into the carriage 20.

Figure 3:
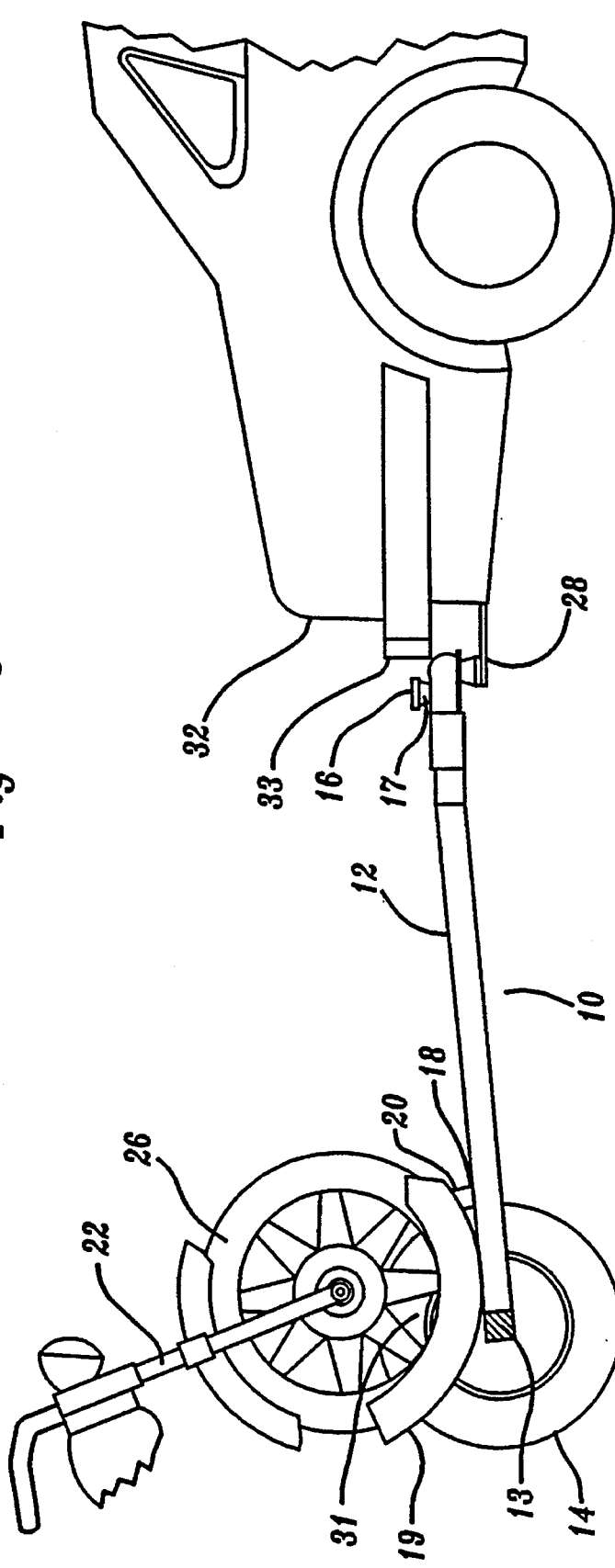
FIG. 3 is a side view partially in cross-section of the present invention as attached to the towing vehicle.

FIG. 3 is a side view partially in cross-section of the motorcycle trailer 10 as attached to a ball-type towbar 28. The ball-type towbar 28 extends from underneath the vehicle's rear bumper 33 enabling the vehicle to make near fight and left angle turns, even though the trailer 10 is attached. With the front wheel 26 of the motorcycle fully engaged within the trough portion of carriage 20 and the socket type hitch suspended off the ground, trailer hitch 17 is slipped over the ball portion 29 of the extending towbar 28. Much of the weight of the front of the motorcycle is exerted downward upon the trailer's frame 12 between the trailer axle 13 and the hitch 17 which helps to maintain the connection between the trailer 10 and the vehicle towbar 28. Directly above the socket 17 is a clamp 16 which is tightened to secure the trailer 10 to the automobile 32.

The last step prior to transporting the motorcycle, as demonstrated by FIG. 4 involves further securing the motorcycle trailer 10 to the towbar 28 and the motorcycle itself to the trailer frame 12 by means of safety chains 48. Typically, retaining device 50 is contoured to fit over the inner face of wheel rim 27 between two of the wheel spokes 31. Also, another retaining device 46 may be used, this device 46 is contoured to fit under and partially extend out from frame 12 so that chains 44 are connected to and extend between the two retaining devices 42 and 46. Although chains could be used alone to secure the motorcycle to the trailer 10, the retaining devices serve the additional function of preventing scratches of the wheel rim 27 and frame 12. To accommodate the differences in motorcycle tire sizes, a liner 60, which is partially shown in FIG. 1, may be used to adapt carriage 20 to smaller motorcycle tire 26 sizes. This added liner 60 which can be permanently fixed or demountably coupled within the carriage also assists carriage 20 in maintaining the motorcycle in an upright towing position.

Referring to FIG. 5, vehicle 32 is shown with towing trailer 10 attached and towed vehicles 62 and 64 mounted and secured to trailer 10. During transport the towed vehicles rear sections tend to bounce around as bumps are encountered. This gives rise to the possibility that the vehicles would come in contact with each other. To prevent the possibility of the two motorcycles coming in contact during towing, a stabilizing member 66 is attached between the rear sections of both vehicles 62 and 64 at points 67 and 68. It will be understood that lights and fenders can be provided on the towing device to comply with transportation regulations.

While the above description constitutes the preferred embodiments of the present invention, it will be appreciated that the invention is susceptible to modification, variation and change without departing from the proper scope and fair meaning of the accompanying claims.

What is claimed is:

1. A trailer for towing at least one vehicle having a single front wheel mounted on an axle with a towing vehicle, comprising:

a rotatable frame;

at least two wheels which support said frame, each wheel being rotatable about an axle, and the frame being rotatable about said at least two wheels;

means on said frame for retaining the front wheel of said vehicle, said means including one or more arcuate shaped carriage members substantially fixably mounted to said frame wherein said carriage members are rotatable about said at least two wheels in accordance with rotation of said rotatable frame to receive said front wheel of said vehicle, said carriage members serving to secure said at least one vehicle in an upright position, said carriage members being arranged to support said front wheel of said vehicle such that said axle of said vehicle is over and ahead of said trailer axle whereby weight of the front wheel of said vehicle being transferred to said trailer assists in maintaining said vehicle in an upright position during towing;

means for attaching said trailer to a towing device; and means for securing said at least one vehicle to said trailer.

2. The trailer according to claim 1, wherein said axle is a rear axle and said frame is rotatable about a rear axle to position said carriage members to receive said at least one vehicle.

3. The trailer according to claim 2, wherein said frame is rotated about said rear axle such that a leading portion of said carriage member partially engages a surface upon which said vehicle to be towed is positioned, said front wheel of said at least one vehicle to be towed rollable into said trough.

4. The trailer according to claim 3, wherein said trough is provided with a liner which conforms to a width of said at least one motorcycle's front wheel, said liner being operable to maintain said at least one motorcycle in the upright position.

5. The trailer according to claim 4, wherein said liner is demountably coupled within said trough.

6. The trailer according to claim 3, wherein the front wheel of said at least one vehicle engaged within said trough is elevated off the surface upon which said vehicle is positioned as said frame is rotated to a relatively horizontal position.

7. The trailer according to claim 6, wherein said trough includes means for retaining the front wheel of said vehicle to be towed within said trough.

8. The trailer according to claim 1 wherein said carriage members are provided with side walls thereby forming a trough portion, said trough portion secures a portion of said front wheel such that said vehicle is maintained in an upright position.

9. The trailer according to claim 8, wherein said trough portions secure at least twenty percent of a circumference of said vehicle tire.

10. The trailer according to claim 8, wherein various sized liners are insertable into said trough portions, said various sized liners being operable to secure a vehicle front tire having a corresponding width.

11. The trailer according to claim 8, wherein said carriage members are spaced apart on said frame such that two vehicles may be towed simultaneously.

12. The trailer according to claim 1, wherein said means of attaching said trailer to said towing vehicle comprises a towbar pivotally engaged by a leading end of said frame.

13. The trailer according to claim 12 wherein a ball and socket provides a pivotal engagement of said trailer to said towing vehicle.

14. The trailer according to claim 1, wherein said means for securing said at least one vehicle to be towed comprises a device which is inserted between two spokes on said front wheel of said at least one vehicle to be towed.

15. A motorcycle towing device capable of transporting at least one motorcycle with a front wheel mounted on an axle behind a lead vehicle, comprising:

a frame member having a leading end and a trailing end, said frame being rotatable about an axle, said frame member being operable to partially support said at least one motorcycle;

two arcuate shaped carriage members extending up from said frame for retaining said front wheel of said at least one motorcycle, said carriage substantially fixably mounted on said frame member, said carriage members acting to maintain said at least one motorcycle in an upright position, said carriage members being positioned to support said front wheel of said vehicle such that said axle of said vehicle is over and ahead of said trailer axle whereby weight of the front wheel of said vehicle being transferred to said trailer assists in maintaining said vehicle in an upright position during towing;

means for stabilizing said carriage members;

at least two wheels which support said frame;

means for securing said front wheel within said carriage; and means for attaching said trailer to said lead vehicle.

16. The motorcycle towing device of claim 15, wherein said carriage members partially engage the ground as said leading end of said frame is sufficiently vertically rotated about said axle such that said at least one motorcycle's front wheel can be rolled into said carriage.

17. The motorcycle towing device according to claim 16 wherein said means of attaching said motorcycle towing device to said lead vehicle comprises a towbar having a ball-like projection extending upwardly therefrom and a mating contained on said leading end of said frame, said socket being positioned over said ball-like projection to operably connect said trailer to said lead vehicle.

18. The motorcycle towing device of claim 15, wherein said carriage members are provided with a liner which conforms to a width of said at least one motorcycle's front wheel, said liners being operable to maintain said at least one motorcycle in the upright position.

19. The trailer according to claim 18, wherein said liner is demountably coupled within said trough.

* * * * *